UNITED STATES PATENT OFFICE.

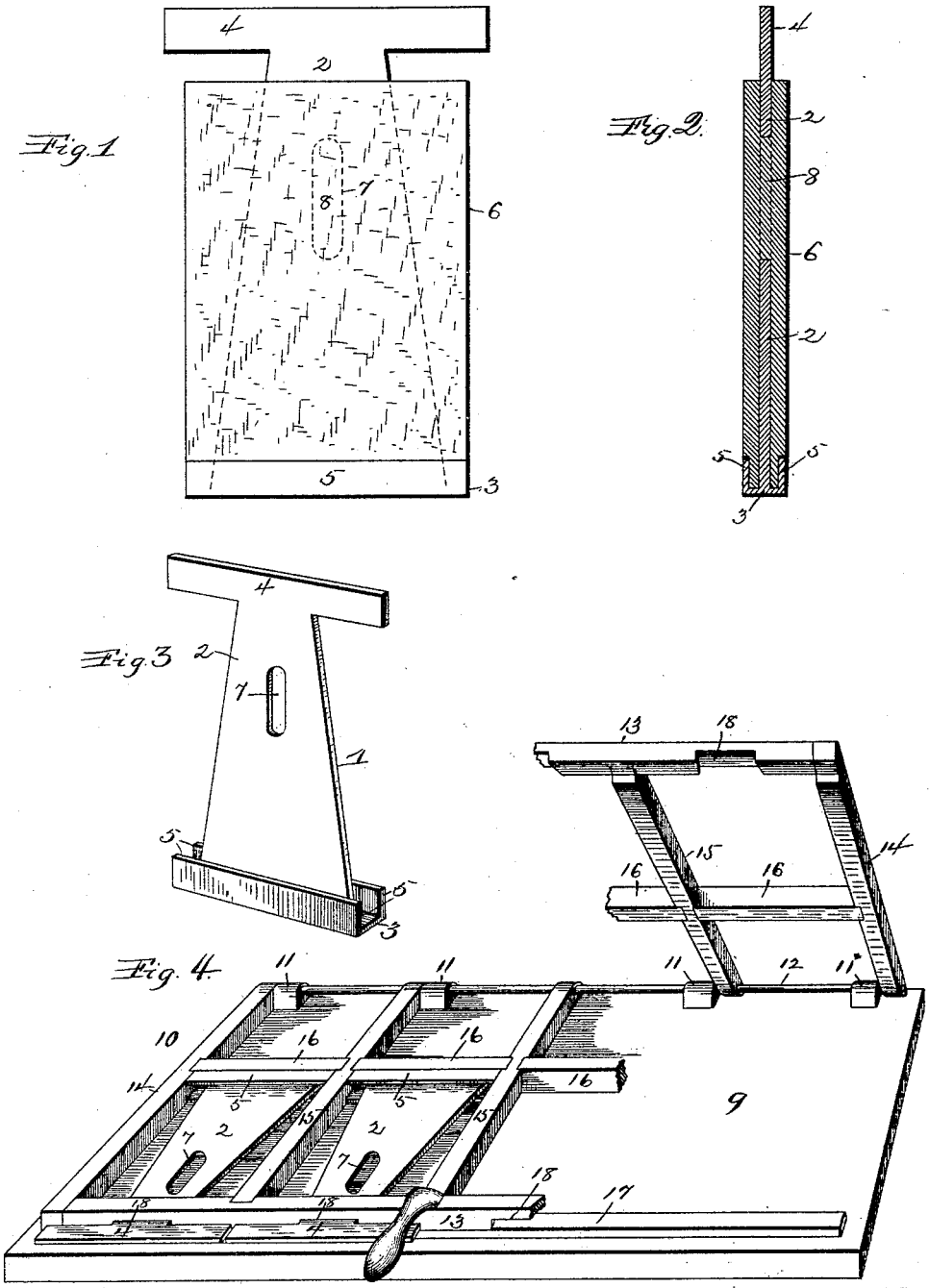

JAMES F. McLAUGHLIN, OF PHILADELPHIA, PENNSYLVANIA.

ELECTRODE FOR SECONDARY BATTERIES.

SPECIFICATION forming part of Letters Patent No. 424,809, dated April 1, 1890.

Application filed December 19, 1889. Serial No. 334,260. (No model.)

*To all whom it may concern:*

Be it known that I, JAMES F. McLAUGHLIN, a citizen of the United States, and a resident of Philadelphia, in the county of Philadelphia and State of Pennsylvania, have invented certain new and useful Improvements in Electrodes for Secondary Batteries, of which the following is a specification.

This invention has reference to improvements in electrodes for secondary batteries; and its object is to produce a secondary-battery electrode in which a large surface of active material is presented, and in which the active material is supported in such manner that it will not break or flake off from its support when used on and subjected to the jars and vibrations of traveling vehicles.

My improvement is illustrated in the accompanying drawings, in which—

Figure 1 is an elevation of a secondary-battery electrode constructed in accordance with my invention. Fig. 2 is a central vertical section of the same. Fig. 3 is a perspective view of the metallic core forming the support for the active material, and Fig. 4 is a perspective view of the mold or casting box for forming the active material around the core or support.

Like numerals of reference indicate like parts throughout the drawings.

Referring to the drawings, there is shown a metallic core or support 1, preferably constructed of lead, and consisting, essentially, of a body 2 rising from a ledge 3, along the center of which it extends, tapering upward and terminating in a cross-head 4. Rising from each edge of the ledge 3 is a longitudinal flange 5, parallel with and at a distance from the lower end of the core-body 2, and this flanged ledge forms a retaining support or foot for the lower end of the block 6, of active material, hereinafter described.

The core-body 2 is provided near its upper end with a perforation 7, and the cross-head 4 extends laterally on each side of the said core-body, so that when the electrode is placed in a suitable containing-vessel the ends of the cross-head will rest on the upper edges of such vessel and support the electrode.

The active material 6 consists of a rectangular block, through the center of which the core-body passes, and above the upper end of which it extends for a short distance. The lower end of this block of active material rests on the ledge 3, and is confined between the flanges 5 and the core-body 2, and an integral portion 8 of the said block extends through the perforation 7 in the core-body and acts in the nature of a rivet, binding the active material firmly to the core and preventing it from being lifted from its seat on the ledge 3. The block of active material I prefer to form of an emulsion of red oxide of lead and plaster-of-paris in dilute sulphuric acid, and I cast the blocks from this emulsion around the cores or supports.

Unlike other compositions of active material, the composition described does not when hardened merely touch the core; but it adheres to the same with great tenacity. This is due to the peculiar characteristic of the composition, which shrinks considerably when drying. The result of this is that when roughly handled the active material does not peel off, and the utility of the electrode is thus maintained for an indefinite time. I can therefore dispense with inclosing supporting-frames, which in other electrodes of this character obstruct the access of the electrolyte to the active material. The block containing such material is in my electrode quite bare except at the lower edge, where it rests upon the ledge of the core.

An apparatus for molding the blocks of active material around the cores is illustrated in Fig. 4, and it consists, essentially, of a table 9, to which is hinged a frame 10 by means of eyes 11, secured to the table near one edge, and a pintle-rod 12. This frame consists of a front bar 13, end bars 14, secured at one end to the front bar, division-bars 15, parallel with the end bars and seated in notches in the front bar, and spacing-bars 16, parallel with the front bar and at a distance therefrom slightly greater than the length of the block of active material to be cast. The end bars 14 and division-bars 15 extend beyond the spacing-strips 16, and have eyes formed in them for the passage of the pintle-rod 12, about which the frame turns, and this frame is so hinged on the rod 12 that when turned down upon the table all parts will rest thereon except the front bar 13, which is thinner than the end and division bars, and is so secured to them that when the end, division, and spacing bars rest upon the table the said front bar is a short distance above the table. On the table, under this bar 13, is a strip 17, equal in width to the said bar and of such thickness that the front bar will rest on it when the frame is turned down upon the table. The division-bars 15 separate the frame into a series of compartments, and central to each compartment the front bar 13 is recessed or cut away on the under side, as shown at 18.

When the block of active material is being cast around the core, the latter is in one of the compartments in the frame with the ledge 3 against the spacing-strip 16, and one of the flanges 5 resting on the table 9, while the narrow part of the core-body 2 extends through the recess 18 in the front bar 13 and rests on the strip 17, with the cross-head 4 exterior to the compartment. In order to introduce the core so as to assume the position in the compartment as just described, it is necessary to raise the frame on its hinge before placing the core on the table, and then to lower the frame to the table, so that the said core is confined in the compartment in the manner stated. The height or thickness of the strip 17 is such that the core-body 2 will be supported in a horizontal position in the frame—that is, it is equal in thickness to the width of the ledge 3 from the core-body to the outside of the flange 5. When one or more of the cores have been placed in position in the frame, the emulsion before mentioned is poured into the compartment or compartments containing such core or cores until it completely fills the compartment and surrounds all that portion of the core within the compartment except the flanges 5 and ledge 3. After the emulsion has "set" or hardened, the core and surrounding block of active material are removed by turning the frame upward on its hinge.

It will now be seen that in an electrode constructed as described the active material is supported by the ledge or seat at the lower end of the core, and is thereby prevented from breaking away from its support when subjected to jars and vibrations, and at the same time very nearly the entire surface of the active material is presented to the action of the electrolyte. The upper end of the block is still further supported by the integral portions at each side of the core-piece, extending through the perforation 7. It will also be noticed that the main body of the core being tapered from the ledge 3 upwardly toward the cross-head 4 the edges of this core constitute inclined planes, which in a great measure serve as supports for the body of the active material. This feature of my electrode is of great importance, for it relieves the ledge 3 of the core and the rivet portion 8 of the active material from pressure of the weight of the active material, which is thus uniformly supported and sustained on and about the core.

Having now fully described my invention, I claim and desire to secure by Letters Patent—

1. An electrode for secondary batteries, consisting of a core having a ledge or seat formed at its lower end and a block of active material surrounding the core and seated on the ledge, but otherwise bare, so that all but the bottom surface of the block is exposed to the electrolyte, substantially as described.

2. An electrode for secondary batteries, consisting of a perforated core with a ledge or foot at the lower end, a supporting cross-head at the upper end and tapering from the lower end upwardly, and a block of active material seated on the ledge or foot and surrounding the core-body and locked thereon by a portion of the active material extending through the perforation in the core, substantially as described.

3. An electrode for secondary batteries, consisting of a supporting-core and a bare block surrounding said core and composed of active material, plaster-of-paris, and sulphuric acid, substantially as described.

4. An electrode for secondary batteries, consisting of a block of active material and a supporting-core extending centrally through and inclosed by the said block and tapering from the lower end upward, substantially as described.

In testimony whereof I have signed my name to this specification in the presence of two subscribing witnesses.

JAMES F. McLAUGHLIN.

Witnesses:
EDWIN F. GLENN,
WM. W. KER.